May 11, 1965
W. R. WILLIAMSON
3,183,174
SEA WATER DISTILLATION METHOD AND APPARATUS
TO PROVIDE A SUPERPURE DISTILLATE
Filed May 6, 1958
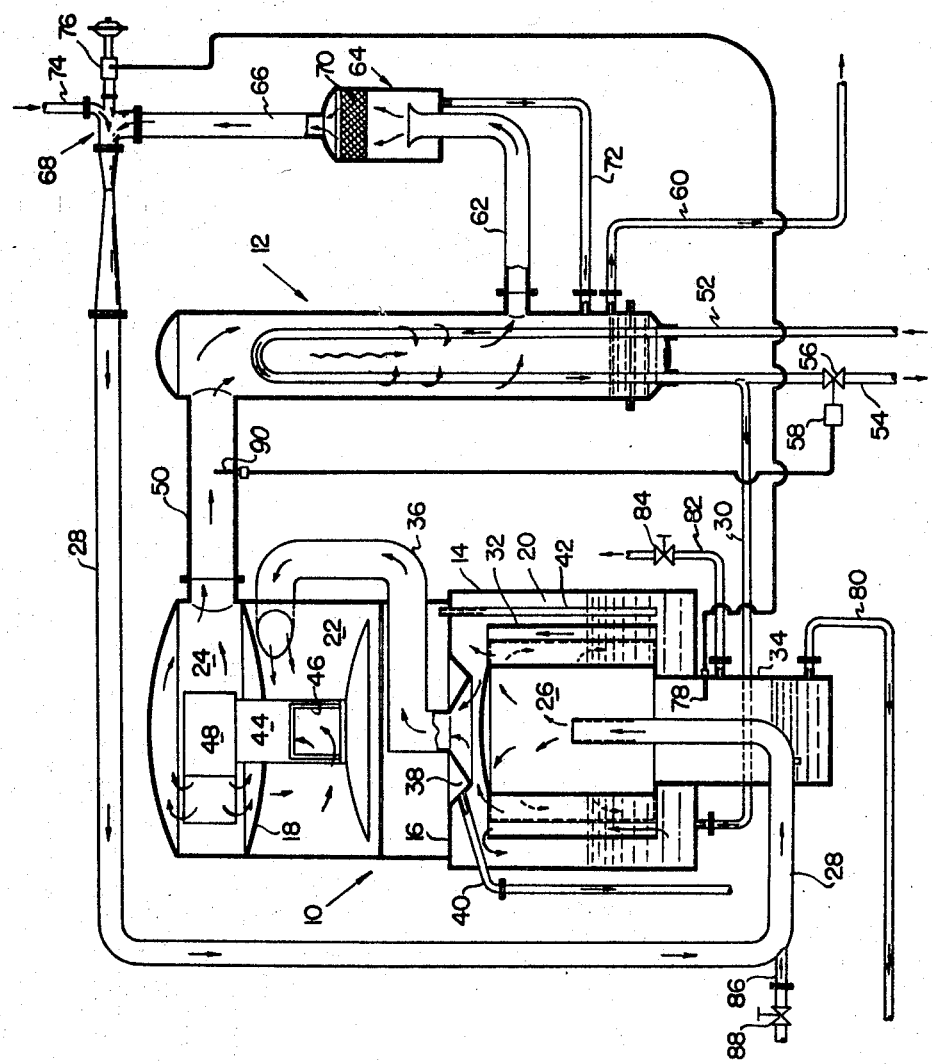
INVENTOR.
WILLIAM R. WILLIAMSON
BY
*Teller & McCormick*
ATTORNEYS

United States Patent Office 3,183,174
Patented May 11, 1965

3,183,174
SEA WATER DISTILLATION METHOD AND APPARATUS TO PROVIDE A SUPERPURE DISTILLATE
William R. Williamson, Wethersfield, Conn., assignor, by mesne assignments, to American Machine & Foundry Company, Inc., New York, N.Y., a corporation of New Jersey
Filed May 6, 1958, Ser. No. 733,287
4 Claims. (Cl. 202—75)

This invention relates to a sea water evaporation and distillation system and to improvements in apparatus and methods employed in the system.

It is the general object of the invention to provide a distillation plant and a method of distillation which will produce a superpure distillate as well as a relatively pure or potable distillate from impure water such as sea water.

Another object of the invention is to improve the efficiency of distillation plants employing steam pumps of the steam ejector type.

It is a further object of the invention to provide means whereby the operation of the distillation plant is rendered automatic and whereby the relative amounts of potable and superpure water are controlled.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The figure of the drawing is a schematic view of a distillation plant provided in accordance with the present invention.

As will be described hereinafter, the distillation plant provided in accordance with the present invention is adapted to provide a potable distillate and also an extremely pure water distillate from sea water or from other impure water. While there are many distillation plants capable of producing a potable, relatively pure distillate, which is at least sufficiently pure and quite desirable for human consumption, none of these distillation plants produces a distillate which is as pure as could be desired for use in power plant boilers or other steam generators. That is, the impurities present in the potable distillate which is used as feed water make-up for the boiler collect and are retained within the boiler and necessitate relatively frequent boiler clean-out or "blow-down." The steam produced in the boiler or steam generator is substantially pure and the condensate recovered therefrom is so pure as to be quite desirable for boiler supply. However, the make-up supply for boiler feed which heretofore has had to be taken from the distillation plant, has so much impure content as to require the aforesaid frequent blow-down. Obviously, as the amount of the impurities increases in the distillate, the necessity for more frequent blow-down also increases with an increase in operating expense and a decrease in general operating efficiency. Thus, the need for a pure distillate in the operation of a steam power plant is quite apparent. The need for pure water in power plant operation is even more critical if the power plant is operated by nuclear energy. That is, the impurities in water become radio active while pure water will not, and it is of course desirable to avoid radio activity because of the danger to personnel from radiation.

Turning now to a more detailed study of the drawing, it will be observed that two of the major components of the distillation plant shown comprise an evaporator 10 and a condenser 12. As will be described, the evaporator receives sea water or any other impure liquid from which a distillate is to be produced and the evaporator also receives steam for out of contact heat transfer to produce sea water vapors which are directed from the evaporator to the condenser wherein at least some of the vapors are condensed to provide a potable distillate. The sea water is pumped through the condenser in an out of contact heat transfer relationship with the vapors whereby the sea water is pre-heated before introduction to the evaporator. In accordance with the present invention, some of the vapor produced in the evaporator is recirculated with the heat producing steam to the evaporator wherein it is condensed to produce the desirably pure or super-pure distillate for make-up feed for the boiler.

The evaporator to be employed in the distillation plant may be of any desired form which utilizes steam as the heating medium. The preferred evaporator is the type shown and described in considerable detail in my co-pending United States patent application, Serial No. 563,571, filed February 6, 1956, now Patent No 2,960,449. The preferred evaporator comprises a substantially vertical shell 14 having two transverse partitions 16 and 18 therein which divide the interior of the shell into three compartments comprising in bottom-to-top order, a boiler chamber 20, a primary separating chamber 22 and a secondary separating chamber 24.

A generally cylindrical but deeply corrugated heat exchanger 26 is disposed in the boiler chamber 20 over the open end of a steam inlet conduit 28 which supplies steam to the interior of the heat exchanger 26 for out of contact heat transfer to sea water or other impure liquid which is introduced to the boiler chamber through a conduit 30. The heat exchanger 26 is of well known construction and is often referred to as a "basket" type heat exchanger, the structural details of which are not necessary to an understanding of the present invention. Preferably, a substantially cylindrical skirt 32, open at the top and open at the bottom, surrounds the heat exchanger 26 to promote circulation of the sea water within the boiler chamber and along the surface of the heat exchanger to enhance the heat transfer and cause efficient evaporation of the said sea water. Most of the steam introduced to the heat exchanger 26 condenses therein and the condensate is collected in the lower end of a preferably cylindrical steam chest 34 which projects through the bottom end header of the evaporator shell and communicates with the interior of the heat exchanger 26 as shown. The remainder of the steam is condensed within the steam chest 34.

The relatively wet sea water vapor produced in the boiler chamber 20 flows into a conduit 36 through an opening which is centrally located in the partition 16 at the top of the boiler chamber. The conduit 36 is formed to extend out of the evaporator from the lower portion of the primary separating chamber 22 and to re-enter the primary separating chamber tangentially adjacent the upper end thereof. The wet sea water vapor and steam flowing through the conduit 36 and re-entering the primary separating chamber 22 tangentially is whirled within the said separating chamber so that the major portion of the salt-carrying water entrained in the steam is separated therefrom by centrifugal force. The separated water flows along the interior surface of the evaporator shell 14 downwardly into an annular sump 38 defined in the partition 16 around the inlet portion of the conduit 36. The salt-carrying water or brine flowing into the sump 38 is removed therefrom through a brine discharge conduit 40. A brine pump, not shown, is employed to pump the brine through the said discharge conduit. A vertically disposed equalizer pipe 42 is provided to take care of any excess brine, permitting the brine to flow from the separating chamber 22 into the boiler chamber 20 wherein it is mixed with the sea water.

The now relatively dry steam flows from the separating chamber 22 into a centrally disposed vertical conduit 44, entering a side opening 46 therein and flowing upwardly in the said conduit through the partition 18 at the top of the primary separating chamber 22. At the top of the conduit 44 there is a swirl inducing volute discharge member 48 which introduces the relatively dry steam to the secondary separating chamber 24 in a swirling stream. Here again, centrifugal force removes the major portion of any water entrained in the steam and the removed water or brine flows through suitable means, such as a pipe, not shown, having an opening in the partition 18 and extending through the conduit 44 downwardly, to the primary separating chamber 22 wherein it flows with the brine removed in said primary separating chamber into the sump 38.

The vapor or steam from which substantially all water or brine has been separated flows from the secondary separating chamber 24 through a discharge conduit 50 into the upper end of the substantially vertically disposed condenser 12. A portion of the vapor entering the condenser 12 is condensed therein by out of contact heat transfer with sea water or the other impure liquid used which is pumped through a conduit or tube 52 extending through the condenser 12 in the manner shown. It is neither desired nor necessary that all the steam entering the condenser 12 be condensed therein. Hence it is possible to use a somewhat smaller and less expensive condenser than would otherwise be required. The sea water supply conduit 52 on the downstream side of the condenser 12 is connected with the sea water inlet conduit 30 for the boiler chamber of the evaporator 10. Some of the sea water which has been pre-heated in the condenser 12 by heat transfer with the vapor therein may be discharged from the system through a conduit 54. A valve 56 located in the conduit 54 controls the amount of sea water dumped from the system and the valve 56 is in turn preferably automatically controlled by suitable valve control means indicated generally by the reference numeral 58 and which is responsive to temperature and/or pressure in the evaporator-to-condenser vapor conduit 50.

The distillate taken from the condenser 12 is sufficiently pure for human consumption and for most uses but it is not as pure as is to be desired for use in a power plant boiler or the like. The reason for this is that despite the fact that substantially all of the salt-carrying entrained water is removed from the vapor within the evaporator 10, there may still be impurities or impure particles carried over with the vapor from the evaporator to the condenser. Most of the impure particles carried with the steam go into solution with the water or condensate formed in the condenser and flow by capillary action and gravity therewith down the sea water tube 52 to the bottom of the condenser where it can be pumped out through a conduit 60 as potable water for human consumption and most uses.

In accordance with the present invention, some wet steam or vapor is taken from the condenser 12 and the water removed therefrom and then the remaining dry steam is recirculated and reintroduced to the evaporator 10 in the steam inlet conduit 28. This wet steam carries some of the impurities and non-condensibles with the water entrained therein, but such impure particles are separated from the steam with the water so that the recirculated and reintroduced steam is substantially without impurities, and the condensate which it produces may be considered a superpure distillate. Any non-condensibles carried over to the boiler section are vented at that point as hereinafter described.

To describe this aspect of the invention more specifically, the steam entering the condenser 12 through the conduit 50 is relatively hot, but carries with it some water particles in the form of droplets or mist. These droplets in turn carry the impurities such as the salts and other solids dissolved therein. As this steam passes downwardly through the condenser 12, it becomes progressively cooler and as a consequence thereof, more and more of the steam is condensed. The droplets containing the impurities act as nuclei and tend to attract other newly formed pure water particles to them, so that, as this condensing process continues, there are formed relatively larger water droplets, each containing impurities. As the droplets increase in size, it is evident that the percentage of impurities contained in a given droplet will continually decrease so that a particle of impurity will be dissolved in a relatively large amount of water by the time the droplet reaches the bottom of the condenser 12. Part of the condensed steam, of course, collects on the surface of the heat exchanging elements of the condenser and proceeds downwardly by capillary action and by gravity to the potable condensate pool in the bottom of the condenser 12, wherefrom it is drawn through the pipe 60. It is preferred practice to withdraw and recirculate from 10 to 60 percent of the total steam entering the condenser, and it is desirable to have the withdrawn steam as wet as possible. Therefore, it is desirable that a steam recirculating pipe or conduit 62 be connected to the condenser 12 at a point as low as possible along the vertical height thereof but above the surface of the potable condensate pool so that no sensible amount of solid water enters the pipe 62. In case a small amount of solid water should enter the pipe 62, it will tend to run back into the body of the condenser 12 and not be carried upwardly around the bend in said pipe. It is desirable to have a vertical run in this pipe 62 of the order of one or two feet to further promote this rough separation of water from the steam.

The wet steam in the pipe 62 is now conducted to what may be described as a wet steam filter or demister 64, the purpose of which is to remove all moisture from the steam so that the remaining steam, upon leaving said demister 64 will be dry. The demister 64 comprises a shell-like, preferably cylindrical receptacle which is connected at its bottom end to the conduit 62 and which is connected at its top end with a conduit 66 extending to the suction port of a steam jet pump indicated generally by the reference numeral 68. A filter pack or demister pack 70 is supported transversely in the shell of the steam filter unit. The shape of this filter pack may be of any desirable form so that the collected liquid water therein may freely migrate through capillary action and gravity to the periphery thereof and subsequently travel downwardly to the bottom of the receptacle wherein it is collected and drains back to the condenser 12 through a demister drain pipe 72. The free area through the body of the filter pack 70 is made sufficiently large so that there will be no reentrainment of water particles which would carry out of the demister. The mesh of the demister is so chosen as to intercept all impurity bearing water droplets. Here is seen the advantage of having the steam very wet. The large water droplets, formed as hereinbefore described, because of their relatively large mass cannot readily wander through the interstices of the mesh without impinging on the fibers thereof. The demister pack 70 actually comprises a multi-layer pack of wire knitted into layers. It will be evident that this device provides a thorough scrubbing action for the wet steam and leaves the steam emerging from the top of the demister substantially dry, even at the relatively low temperature obtaining at this point.

The aforementioned steam jet pump 68 is actuated by a high pressure steam line 74 and serves not only to produce the suction required in the line 66 whereby a portion of the wet steam in the condenser 12 is caused to pass through the demister 64, but also introduces this motive steam, mixed with the dry steam from the demister 64 into the heat exchanger 26 of the evaporator 10. By having the steam from the demister 64 devoid of water, erosion of the working parts in the said jet pump 68 is greatly reduced thus permitting the use of a more efficient jet pump than would be otherwise possible. Furthermore, for a given amount of motive steam, more B.t.u.'s are reintroduced into the heating section of the evaporator since the latent heat of vaporization of any water in the steam is saved. In other words, for a given mass moved by the pump, it is far more efficient to have this in the form of dry steam.

It will thus be seen that, assuming the motive steam from the primary boiler, as on shipboard, to be pure, the condensate collected in the steam chest 34 will be likewise pure and entirely suitable for use as make-up water in the boiler. In fact, should the motive steam be of somewhat less purity than the superpure water obtainable from the steam leaving the demister, it is evident that the present invention also provides means for purifying the water in the main boiler through continuous extraction of such impurities as it may initially have.

Preferably, the jet pump 68 has a variable nozzle which is automatically controlled to control the amount of steam which is induced to flow from the condenser back into the evaporator. Conventional means are employed for automatically controlling the effective area of the nozzle, such means for example comprising a spindle movable within the nozzle and operated by a control unit 76 which is sensitive to pressure. An element 78 sensitive to pressure is disposed within the steam chest 34 to transmit a signal to the control unit 76 whereby to control the flow of steam from the condenser to the evaporator responsive to pressure in the said steam chest.

The pure steam introduced through the conduit 28 to the evaporator heat exchanger 26 when condensed within the said heat exchanger or within the steam chest 34 provides the superpure distillate in the sump of the said steam chest. The superpure condensate or distillate is pumped from the sump in the steam chest 34 through a conduit 80 either to the boiler which produces the steam for the distillation plant or to reserve tanks which are used to make up the feed water for the said boiler. Air and any other non-condensible is vented from the steam chest 34 through a vent conduit 82 or vent condenser if desired having a vent control valve 84 thereon.

In further accord with the present invention, means are provided for controlling the amount and rate at which the potable water distillate is produced in the condenser 12 and the amount and rate at which superpure feed water condensate is produced in the steam chest 34. The said means includes a low pressure steam inlet conduit 86 connected to the high pressure steam inlet conduit 28 on the downstream side of the jet pump 68. The discharge from a steam turbine may conveniently furnish such low pressure steam. A valve 88 is disposed in the low pressure steam conduit 86 to control the amount of low pressure steam introduced and to shut off the supply of low pressure steam. As the valve 88 is opened, the pressure in the steam chest 34 is increased and the increased pressure is sensed by the sensor 78 which signals the jet pump control unit 76 to reduce the motive steam which reduces the flow of steam from the condenser 12 to the evaporator 10 through the moisture separating unit 64. When less of the wet steam is directed from the condenser to the demister as described, more of the vapor from the evaporator will be fully condensed within the condenser 12 to increase the supply of potable water in the said condenser and at the same time reducing the amount of superpure condensate provided in the steam chest 34. When the valve 88 is closed or moved toward closed position, the pressure reduces in the steam chest 34 and transmits a signal to the jet pump calling for more flow of steam from the condenser through the demister to the evaporator for the formation of a greater quantity of superpure water while the quantity and rate of production of potable distillate in the condenser 12 is reduced.

Further control of the ratio of the superpure distillate made to potable distillate made is achieved by operation of the sea water flow control valve 56. As previously mentioned, the valve 56 is operated automatically by a control unit 58 which is responsive to temperature and/or pressure. A conventional control unit 58 may comprise a bellows which can be pre-set to open and to close the valve 56 at preselected temperatures or preselected pressure levels. Thus, if a temperature and/or pressure sensing element 90 is located in the vapor conduit 50 interconnecting the evaporator 10 and the condenser 12 and is connected to the valve control unit 58, the valve 56 can be opened and closed responsive to temperature and/or pressure in the said conduit 50. For example, if the element 90 is sensitive to temperature, the valve control unit 58 can be pre-set to open the valve 56 whereby to increase the flow of sea water in the tube 52 through the condenser 12 when the temperature of the vapor in the conduit 50 reaches a preselected level. The increased sea water flow in the condenser 12 will cause increased condensation therein and create a greater vacuum within the said condenser whereby less vapor will be recirculated and the amount of superpure water made will be decreased in proportion to the amount of potable distillate made. If the temperature of the vapor in the conduit 50 falls below a preselected level, the valve 56 will be automatically closed and less sea water will circulate in the condenser 12. This will increase the pressure in the condenser and more vapor will be recirculated by the jet pump to make a greater proportion of superpure distillate.

The efficiency of the above described distilling plant is maximum when it is producing the greatest quantity of superpure water, and under these conditions is comparable to a double effect evaporator of conventional design. It will be readily understood that the primary cost is less since there is but one evaporator-separator unit and no vacuum pump, and the plant uses the efficient heat-pump cycle. Under optimum operating conditions, for every 1000 B.t.u.'s of motive or primary steam introduced into the system through the steam chest, approximately 600 B.t.u.'s are extracted from the demister in the form of dry steam and the total of 1600 B.t.u.'s enter the boiler of the evaporator.

The controls may be set so that most of the output distillate is in the form of potable water. It is not feasible to have all the output in this form because it is necessary to recirculate enough steam to carry the non-condensibles back to the boiler wherein they are vented to atmosphere, as previously mentioned. This mode of operation entails a slight loss in efficiency. It is more efficient to operate at maximum superpure distillate output even though this may produce more water than is required for boiler make-up. The excess is, of course, fed to the potable water tanks.

In the foregoing specification the terms "steam" and "vapor" are used synonymously and are intended to have the same meaning. The terms as used in the following claims are also intended to have the same technical meaning, but "vapor" or "vapors" are used to designate the steam derived from evaporation, and "steam" is used to designate the motive steam and that portion of the vapor which is recirculated for condensation with the motive steam in the evaporator heat exchanger and steam chest.

The invention claimed is:

1. A method of producing a potatable distillate and a superpure distillate for boiler make-up feed from sea water, characterized by the steps of introducing steam in indirect heat transfer relationship to said sea water to produce vapor therefrom, introducing lower pressure steam into the steam in heat transfer relationship to the sea water, whereby to increase the pressure of said steam, separating entrained sea water from the said vapor, partially condensing the vapor to provide said potable distillate, inducing flow of the vapor remaining after partial condensation thereof into said steam in indirect heat transfer relationship to said impure water, separating moisture from the vapor before introduction into the steam, condensing said steam to provide said superpure distillate, and controlling the flow of said remaining vapor responsive to the pressure of the steam in heat transfer relationship to the sea water.

2. A distilling plant comprising an evaporator adapted to use steam for out of contact heat transfer to vaporize impure water and having a chest to collect the steam and condensate formed therefrom, a steam inlet conduit for the evaporator, a jet pump connected to said steam inlet conduit and connectible with a high pressure steam generator, means for separating at least some of the impurity-bearing moisture from the produced vapors, a discharge conduit connected to the evaporator for the vapors from said impure water, a condenser connected to said discharge conduit to produce a potable water distillate from the vapors, conduit means connected between said condenser and said inlet conduit on the upstream side of the said jet pump whereby the jet pump induces flow of wet vapor from said condenser toward the inlet conduit, a moisture separator connected in said conduit means to provide substantially pure steam flow to the inlet conduit whereby to provide a pure water condensate in the evaporator usable as make-up feed for the steam generator, and means responsive to pressure in the evaporator steam chest for controlling said jet pump and thereby controlling the flow of steam from said condenser to the inlet conduit.

3. A distilling plant comprising an evaporator adapted to use steam for out of contact heat transfer to impure water to be vaporized and having a chest to collect the steam and condensate formed therefrom, a steam inlet conduit for the evaporator, a jet pump connected to said steam inlet conduit and connectible with a high pressure steam generator, a discharge conduit connected to the evaporator for the vapors from said impure water, a condenser connected to said discharge conduit to produce a potable water distillate from the vapors, conduit means connected between said condenser and said inlet conduit on the upstream side of the said jet pump whereby the jet pump induces flow of wet vapor from said condenser toward the inlet conduit, a moisture separator connected in said conduit means to provide substantially pure steam flow to the inlet conduit whereby to provide a pure water condensate in the evaporator usable as make-up feed for the steam generator, means responsive to pressure in the evaporator steam chest for controlling said jet pump and thereby controlling the flow of steam from said condenser to the inlet conduit, and means for introducing low pressure steam to said inlet conduit on the downstream side of said jet pump to increase the pressure in the evaporator steam chest and thereby to increase the proportion of potable water distillate to pure water condensate.

4. A distilling plant comprising an evaporator adapted to use steam for out of contact heat transfer to impure water to be vaporized and having a chest for the collection of steam and the condensate formed therefrom, a steam inlet conduit for the evaporator, a jet pump connected to said steam inlet conduit and connectible with a high pressure steam generator, a discharge conduit connected to the evaporator for the vapors from the impure water, a condenser connected to said discharge conduit and having means for collecting a potable distillate from the vapors, conduit means connected between said condenser and the inlet conduit on the upstream side of said jet pump whereby the jet pump induces the flow of wet vapor from the condenser toward the inlet conduit, a moisture separator connected in said conduit means comprising a housing and a filter pack adapted to pass steam while collecting moisture which flows into the housing, passage means for returning collected moisture from the housing to the potable distillate in the condenser, the steam passing the moisture separator providing pure water condensate in the evaporator usable as make-up feed for the steam generator, means for controlling said jet pump responsive to pressure in the evaporator steam chest whereby to control the amount of steam flow from the condenser to the inlet conduit, and means for introducing low pressure steam to said inlet conduit on the downstream side of said jet pump whereby to increase pressure in said chest and thereby automatically to increase the proportion of potable water distillate to pure water condensate.

References Cited by the Examiner

UNITED STATES PATENTS

| | | | |
|---|---|---|---|
| 818,858 | 4/06 | Thoens | 202—197 |
| 1,150,589 | 8/15 | French | 202—66 X |
| 1,213,596 | 1/17 | De Baufre | 202—75 |
| 1,289,984 | 12/18 | Welch | 202—6 |
| 1,466,535 | 8/23 | Kyrides | 202—197 X |
| 1,713,431 | 5/29 | Gensecke | 202—197 X |
| 1,943,106 | 1/34 | Burnham | 202—197 |
| 2,054,096 | 9/36 | Potts et al. | 202—69 X |
| 2,379,518 | 7/45 | Hall | 202—69 |
| 2,398,396 | 4/46 | Powell | 202—66 |
| 2,440,173 | 4/48 | Henszey | 202—197 X |
| 2,441,361 | 5/48 | Kirgan | 202—75 X |
| 2,619,453 | 11/52 | Anderson | 202—75 |
| 2,649,408 | 8/53 | Williamson | 202—182 X |
| 2,675,346 | 4/54 | Maclean | 202—69 |
| 2,881,116 | 4/59 | Siegfried | 209—197 X |

FOREIGN PATENTS

| | | |
|---|---|---|
| 528,145 | 10/40 | Great Britain. |
| 616,329 | 1/49 | Great Britain. |

NORMAN YUDKOFF, *Primary Examiner.*

RICHARD P. NEVIUS, ALPHONSO D. SULLIVAN, GEORGE D. MITCHELL, *Examiners.*